US010490812B2

(12) United States Patent
Yokoi et al.

(10) Patent No.: US 10,490,812 B2
(45) Date of Patent: Nov. 26, 2019

(54) NEGATIVE ELECTRODE INCLUDING SIOX PARTICLES HAVING CARBON COATING, CARBONACEOUS ACTIVE MATERIAL PARTICLES, AND COMPOUND HAVING CARBOXYL OR HYDROXYL GROUP AND NONAQUEOUS ELECTROLYTE SECONDARY BATTERIES

(71) Applicant: Sanyo Electric Co., Ltd., Daito-shi, Osaka (JP)

(72) Inventors: Mai Yokoi, Tokushima (JP); Yasunobu Iwami, Tokushima (JP); Taizou Sunano, Tokushima (JP)

(73) Assignee: SANYO Electric Co., Ltd., Daito-shi (JP)

( * ) Notice: Subject to any disclaimer, the term of this patent is extended or adjusted under 35 U.S.C. 154(b) by 135 days.

(21) Appl. No.: 15/551,158

(22) PCT Filed: Feb. 15, 2016

(86) PCT No.: PCT/JP2016/000756
§ 371 (c)(1),
(2) Date: Aug. 15, 2017

(87) PCT Pub. No.: WO2016/136178
PCT Pub. Date: Sep. 1, 2016

(65) Prior Publication Data
US 2018/0040886 A1    Feb. 8, 2018

(30) Foreign Application Priority Data

Feb. 25, 2015    (JP) ................ 2015-035025

(51) Int. Cl.
*H01M 4/48*    (2010.01)
*H01M 4/13*    (2010.01)
(Continued)

(52) U.S. Cl.
CPC ............. *H01M 4/483* (2013.01); *H01M 4/13* (2013.01); *H01M 4/133* (2013.01); *H01M 4/36* (2013.01);
(Continued)

(58) Field of Classification Search
CPC ........ H01M 4/483; H01M 4/13; H01M 4/133; H01M 4/36; H01M 4/364; H01M 4/366;
(Continued)

(56) References Cited

U.S. PATENT DOCUMENTS

2006/0234127 A1* 10/2006 Kim .................... H01M 4/0402
429/232
2007/0099088 A1*  5/2007 Kwon .................. H01M 4/366
429/232

(Continued)

FOREIGN PATENT DOCUMENTS

CN    103782426 A    5/2014
JP    2002-42806 A    2/2002
(Continued)

OTHER PUBLICATIONS

International Search Report dated May 17, 2016, issued in counterpart International Application No. PCT/JP2016/000756 (2 pages).
(Continued)

*Primary Examiner* — Sean P Cullen
(74) *Attorney, Agent, or Firm* — Westerman, Hattori, Daniels & Adrian, LLP

(57) ABSTRACT

A negative electrode for nonaqueous electrolyte secondary batteries is provided which includes $SiO_x$ and allows the cycle characteristics of batteries to be enhanced. A negative electrode according to an example embodiment includes a negative electrode current collector and a negative electrode mixture layer disposed on the current collector. The negative electrode mixture layer includes $SiO_x$ ($0.5 \leq x \leq 1.5$) particles
(Continued)

having a carbon coating on a particle surface, carbonaceous active material particles, and a compound having at least one of a carboxyl group and a hydroxyl group and having an average number of etherifying agent moieties present per unit molecule of not more than 0.8. The carbon coating includes a first coating disposed on the surface of the $SiO_x$ and a second coating disposed on the first coating and including carbon having higher crystallinity than the carbon forming the first coating.

4 Claims, 1 Drawing Sheet

(51) Int. Cl.
*H01M 4/36* (2006.01)
*H01M 4/587* (2010.01)
*H01M 4/62* (2006.01)
*H01M 4/133* (2010.01)
*H01M 10/0525* (2010.01)
*H01M 4/485* (2010.01)
*H01M 10/052* (2010.01)

(52) U.S. Cl.
CPC .......... *H01M 4/364* (2013.01); *H01M 4/366* (2013.01); *H01M 4/368* (2013.01); *H01M 4/48* (2013.01); *H01M 4/485* (2013.01); *H01M 4/587* (2013.01); *H01M 4/62* (2013.01); *H01M 4/621* (2013.01); *H01M 10/052* (2013.01); *H01M 10/0525* (2013.01)

(58) Field of Classification Search
CPC ........ H01M 4/368; H01M 4/48; H01M 4/485; H01M 4/587; H01M 4/62; H01M 4/621; H01M 10/0525
USPC .......................... 429/217, 218.1, 231.8, 232
See application file for complete search history.

(56) References Cited

U.S. PATENT DOCUMENTS

| 2007/0122707 A1* | 5/2007 | Kwon | H01M 4/133 |
| | | | 429/231.95 |
| 2007/0122710 A1* | 5/2007 | Kwon | H01M 4/133 |
| | | | 429/232 |
| 2013/0309578 A1 | 11/2013 | Umeno et al. | |
| 2014/0205904 A1 | 7/2014 | Sasaki | |
| 2014/0242469 A1* | 8/2014 | Yamamoto | H01M 4/364 |
| | | | 429/231.8 |

FOREIGN PATENT DOCUMENTS

| JP | 2011-76744 A | 4/2011 | |
| JP | 2012-38597 A | 2/2012 | |
| JP | 4954270 B2 | 6/2012 | |
| JP | 2014-7120 A | 1/2014 | |
| JP | 2016-58283 A | 4/2016 | |
| WO | WO-2007133005 A1 * | 11/2007 | ............ H01M 4/131 |
| WO | 2012/077653 A1 | 6/2012 | |
| WO | 2013/031690 A1 | 3/2013 | |
| WO | 2015/115053 A1 | 8/2015 | |

OTHER PUBLICATIONS

English Translation of Search Report dated Aug. 19, 2019, issued in counterpart CN Application No. 201680004690.5 (2 pages).

* cited by examiner

NEGATIVE ELECTRODE INCLUDING SIOX PARTICLES HAVING CARBON COATING, CARBONACEOUS ACTIVE MATERIAL PARTICLES, AND COMPOUND HAVING CARBOXYL OR HYDROXYL GROUP AND NONAQUEOUS ELECTROLYTE SECONDARY BATTERIES

TECHNICAL FIELD

The present disclosure relates to negative electrodes for nonaqueous electrolyte secondary batteries, and to nonaqueous electrolyte secondary batteries.

BACKGROUND ART

Silicon materials such as silicon (Si) and silicon oxides represented by $SiO_x$ are known to store more lithium ions per unit volume than carbon materials such as graphite. In particular, $SiO_x$ has been studied for use in negative electrodes in lithium ion batteries and the like because its volume change by the intercalation of lithium ions is smaller than that of Si. However, $SiO_x$ has low conductivity as compared to graphite. Negative electrode materials have been then presented in which the surface of $SiO_x$ particles is coated with carbon to enhance the conductivity (see, for example, Patent Literature 1). Further, to attain enhanced cycle characteristics, Patent Literature 2 discloses a negative electrode material obtained by mixing graphite with carbon-coated $SiO_x$ particles.

CITATION LIST

Patent Literature

PTL 1: Japanese Published Unexamined Patent Application No. 2002-42806
PTL 2: Japanese Patent No. 4954270

SUMMARY OF INVENTION

Technical Problem

Increasing the capacity and suppressing a capacity drop associated with charging and discharging are important challenges in nonaqueous electrolyte secondary batteries. An object of the present disclosure is to provide a high-capacity negative electrode for nonaqueous electrolyte secondary batteries which includes $SiO_x$ and allows the cycle characteristics of batteries to be enhanced.

Solution to Problem

An aspect of the present disclosure resides in a negative electrode for nonaqueous electrolyte secondary batteries including a negative electrode current collector and a negative electrode mixture layer disposed on the current collector, wherein the negative electrode mixture layer includes $SiO_x$ ($0.5 \leq x \leq 1.5$) particles having a carbon coating on a particle surface, carbonaceous active material particles, and a compound having at least one of a carboxyl group and a hydroxyl group and having an average number of etherifying agent moieties present per unit molecule of not more than 0.8, and the carbon coating includes a first coating disposed on the surface of the $SiO_x$ particles and a second coating disposed on the first coating and including carbon having higher crystallinity than the carbon forming the first coating.

Advantageous Effects of Invention

With the negative electrode for nonaqueous electrolyte secondary batteries according to one aspect of the present disclosure, a nonaqueous electrolyte secondary battery having a high capacity and excellent cycle characteristics can be provided.

DESCRIPTION OF EMBODIMENTS

Figure 1:
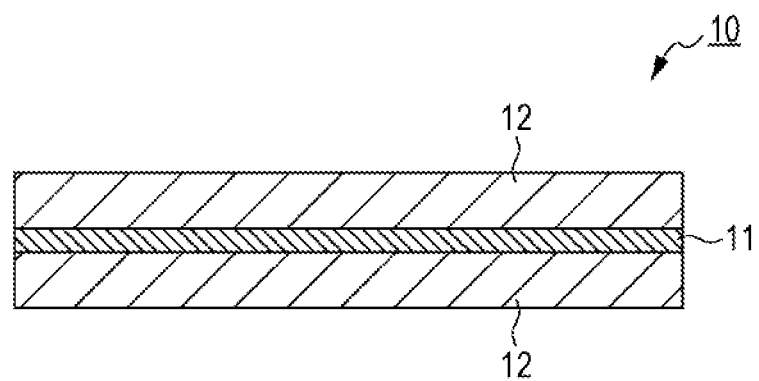
FIG. 1 is a sectional view schematically illustrating a negative electrode according to an example embodiment.

A negative electrode for nonaqueous electrolyte secondary batteries according to the present disclosure has a first negative electrode active material that is $SiO_x$ ($0.5 \leq x \leq 1.5$) particles having a carbon coating on a particle surface. In the negative electrode of the present disclosure, a first carbon coating based on less crystalline carbon is disposed on the surface of the $SiO_x$ particles. This configuration probably facilitates the formation of a quality SEI film on the surface of the $SiO_x$ particles. Further, a second carbon coating which includes highly crystalline carbon is disposed on the first carbon coating, and thereby the conductivity of the first negative electrode active material is enhanced and, for example, the precipitation of lithium during charging is suppressed. Further, as a binder, a compound is used which has at least one of a carboxyl group and a hydroxyl group and has an average number of etherifying agent moieties present per unit molecule of not more than 0.8. This configuration prevents the aggregation of the binder and enhances the adhesion among the materials constituting the mixture layer and also the adhesion of the mixture layer with respect to the current collector. A nonaqueous electrolyte secondary battery having the negative electrode of the present disclosure has no or minor capacity drop associated with charging and discharging cycles and attains good cycle characteristics probably by virtue of the synergetic action of these effects.

An example embodiment will be described in detail hereinbelow.

The drawings used in the description of the embodiment are schematic, and the configurations of the constituents illustrated in the drawings such as sizes are sometimes different from the actual ones. Specific configurations such as sizes should be estimated in consideration of the description given below.

A nonaqueous electrolyte secondary battery according to an example embodiment includes the negative electrode described above, a positive electrode, and a nonaqueous electrolyte including a nonaqueous solvent. Preferably, a separator is disposed between the positive electrode and the negative electrode. For example, the nonaqueous electrolyte secondary battery has a structure in which an electrode assembly that includes the positive electrode and the negative electrode wound together via the separator, and the nonaqueous electrolyte are accommodated in a housing. The wound electrode assembly may be replaced by other form of an electrode assembly such as a stacked electrode assembly which includes positive electrodes and negative electrodes stacked on top of one another via separators. Examples of the battery cases for accommodating the electrode assembly and the nonaqueous electrolyte include metallic cases such as cylindrical cases, prismatic cases, coin-shaped cases and button-shaped cases, and resin cases formed by laminating resin sheets (laminate batteries).

[Positive Electrodes]

The positive electrode includes a positive electrode current collector composed of, for example, a metallic foil or the like, and a positive electrode mixture layer disposed on the current collector. The positive electrode current collector may be, for example, a foil of a metal that is stable at positive electrode potentials such as aluminum, or a film having a skin layer of such a metal. The positive electrode mixture layer includes a positive electrode active material, and preferably further includes a conductive agent and a binder. The positive electrode may be fabricated by, for example, applying a positive electrode mixture slurry including the positive electrode active material and other components such as a conductive agent and a binder onto a positive electrode current collector, and drying and rolling the wet films so as to form positive electrode mixture layers on both sides of the current collector.

Examples of the positive electrode active materials include layered lithium composite oxides containing Li and a metal element M. For example, it is preferable that the metal element M be a transition metal element such as Co, Ni or Mn, and the positive electrode active material be a lithium transition metal oxide. The lithium transition metal oxide may contain a metal element M other than transition metals. Examples of the metal elements M include Co, Ni and Mn, and also include Mg, Sc, Y, Fe, Cu, Zn, Al, Cr, Pb, Sb and B. Some preferred examples of the lithium transition metal oxides are Ni—Co—Mn, Ni—Mn—Al and Ni—Co—Al composite oxides. A single or a mixture of such materials may be used. The surface of the particles of the positive electrode active material may be coated with fine particles of inorganic compounds, for example, oxides such as aluminum oxide ($Al_2O_3$), phosphoric acid compounds and boric acid compounds.

The conductive agent may be used to enhance the electrical conductivity of the positive electrode mixture layers. Examples of the conductive agents include carbon materials such as carbon black, acetylene black, Ketjen black and graphite. These may be used singly, or two or more may be used in combination.

The binder may be used to enhance the bonding of components such as the positive electrode active material to the surface of the positive electrode current collector while ensuring a good contact between the positive electrode active material and the conductive agent. Examples of the binders include fluororesins such as polytetrafluoroethylene (PTFE) and polyvinylidene fluoride (PVdF), polyacrylonitrile (PAN), polyimide resins, acrylic resins and polyolefin resins. These resins may be used in combination with carboxymethylcellulose (CMC) or salts thereof (such as CMC-Na, CMC-K and CMC-$NH_4$, and partially neutralized salts), polyethylene oxide (PEO) and the like. These may be used singly, or two or more may be used in combination.

[Negative Electrodes]

FIG. 1 is a sectional view of a negative electrode 10 according to an example embodiment.

The negative electrode 10 includes a negative electrode current collector 11, and negative electrode mixture layers 12 disposed on the current collector. The negative electrode current collector 11 may be, for example, a foil of a metal that is stable at potentials of the negative electrode 10 such as copper, or a film having a skin layer of such a metal. The negative electrode mixture layers 12 include a negative electrode active material and, as a binder, a compound having at least one of a carboxyl group and a hydroxyl group and having an average number of etherifying agent moieties present per unit molecule of not more than 0.8. This compound serves as a binder. The negative electrode mixture layers 12 include $SiO_x$ ($0.5 \leq x \leq 1.5$) particles 21 having a carbon coating 22 on the surface which serve as a first negative electrode active material 20 (see FIG. 2 described later), and carbonaceous active material particles as a second negative electrode active material. The negative electrode 10 may be fabricated by, for example, applying a negative electrode mixture slurry including the negative electrode active materials and other components such as the binder onto a negative electrode current collector 11, and drying and rolling the wet films so as to form negative electrode mixture layers on both sides of the current collector.

The carbonaceous active material particles may be a conventional negative electrode active material such as graphite or hard carbon. Examples of the graphites include natural graphites such as flake graphite, massive graphite and earthy graphite, and artificial graphites such as massive artificial graphite (MAG) and graphitized mesophase carbon microbeads (MCMB). When graphite is used, the mass ratio of the first negative electrode active material 20 to the second negative electrode active material (graphite) is preferably 1:99 to 20:80. This mass ratio of the first negative electrode active material 20 to the graphite ensures that a high capacity and enhanced cycle characteristics will be both attained.

Figure 2:
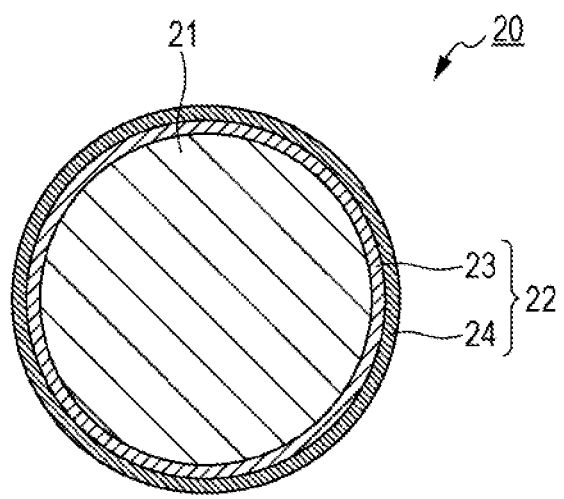
FIG. 2 is a sectional view schematically illustrating a negative electrode active material according to an example embodiment.

FIG. 2 is a sectional view of a first negative electrode active material 20 according to an example embodiment.

The first negative electrode active material 20 is $SiO_x$ ($0.5 \leq x \leq 1.5$) particles 21 having a carbon coating 22 on the surface. That is, the first negative electrode active material 20 is composed of $SiO_x$ particles 21 and a carbon coating 22. For example, the carbon coating 22 is formed to cover the entire surface of the $SiO_x$ particles 21. While FIG. 2 illustrates the first negative electrode active material 20 as being spherical, the shape of the particles is not particularly limited. In actuality, the particles are frequently angular or cornered, and have various shapes such as, for example, masses, flat forms, long thin rods, and needle forms. Because the carbon coating 22 is thin, the particle size of the first negative electrode active material 20 is substantially the same as the particle size of the $SiO_x$ particles 21.

The $SiO_x$ particles 21 are particles based on silicon oxide represented by $SiO_x$ ($0.5 \leq x \leq 1.5$). For example, $SiO_x$ has a structure in which Si is dispersed in an amorphous $SiO_2$ matrix. The presence of Si dispersed may be identified by observation with a transmission electron microscope (TEM). $SiO_x$ can store more lithium ions than carbon materials such as graphite and has a higher capacity per unit volume, thus contributing to increasing the capacity of batteries. The $SiO_x$ particles 21 may contain lithium silicate (for example, lithium silicate represented by $Li_{2z}SiO_{(2+z)}$ ($0<Z<2$)) within the particles, or may have a structure in which Si is dispersed in lithium silicate.

The $SiO_x$ particles 21 preferably have a BET specific surface area of not more than 5 $m^2/g$, and more preferably not more than 3 $m^2/g$. When the specific surface area is 5 $m^2/g$ or less, a homogeneous first coating 23 may be formed easily on the entire surface of the $SiO_x$ particles 21 and, for example, a quality SEI film is formed over the entire surface of the SiO$_x$ particles 21, resulting in further enhancements in cycle characteristics. The BET specific surface area may be measured with HM-1201 manufactured by Mountech Co., Ltd.

From points of view such as high capacity and enhanced cycle characteristics, the average particle size of the SiO$_x$ particles 21 is preferably 1 to 15 μm, and more preferably 4 to 10 μm. The average particle size of the first negative electrode active material 20 is the volume average particle size (Dv50) of primary particles at 50% cumulative volume in the grain size distribution measured by a laser diffraction scattering method (using, for example, LA-750 manufactured by HORIBA, Ltd.).

The carbon coating 22 has a first coating 23 disposed on the surface of the SiO$_x$ particles 21, and a second coating 24 which is disposed on the first coating 23 and includes carbon having higher crystallinity than the carbon forming the first coating 23. In other words, the first coating 23 includes carbon having lower crystallinity than the carbon forming the second coating 24. The first coating 23 based on less crystalline carbon facilitates the formation of a quality SEI film, and the second coating 24 based on highly crystalline carbon enhances the conductivity of the first negative electrode active material 20. The carbon coating 22 may contain components other than carbon such as, for example, oxygen and hydrogen while ensuring that properties such as conductivity are not impaired.

It is known that during the first charging, a SEI film which protects the surface of a negative electrode active material is formed to prevent the active material from side reaction with the electrolytic solution during subsequent charging and discharging. In the first negative electrode active material 20, the carbon forming the first coating 23 has low crystallinity and allows the electrolytic solution to penetrate therethrough easily. Consequently, a SEI film will be formed uniformly over the surface of the SiO$_x$ particles 21 and will suppress the side reaction of the material with the electrolytic solution. Further, the first coating 23 having low crystallinity can easily follow the swelling and shrinkage of the SiO$_x$ particles 21 due to charging and discharging. It is therefore probable that the first coating 23 shows a resistance to cracking and prevents the SiO$_x$ particles 21 from direct contact with the electrolytic solution, reducing the degradation of the active material. Further, the second coating 24 having high crystallinity provides high conductive properties between the active material particles, thus enhancing the charging and discharging efficiency.

As described hereinabove, the carbon coating 22 has a two-layer structure in which a low crystalline carbon coating is disposed inside the first negative electrode active material 20, and a highly crystalline carbon coating is disposed on the outside of the first negative electrode active material 20. The crystallinity of the first coating 23 and the second coating 24 may be identified based on Raman spectra obtained by Raman spectroscopy. Specifically, Raman spectra obtained by Raman spectroscopy are analyzed to calculate the intensity of a peak near 1360 cm$^{-1}$ (I$_D$) and the intensity of a peak near 1590 cm$^{-1}$ (I$_G$), and the peak intensity ratios I$_D$/I$_G$ are compared. It can be said that the lower the peak intensity ratio I$_D$/I$_G$, the higher the crystallinity of the carbon coating. That is, the intensity ratio I$_D$/I$_G$ measured with respect to the second coating 24 is lower than the intensity ratio I$_D$/I$_G$ measured with respect to the first coating 23.

The carbon coating 22 is preferably formed in a ratio of 0.5 to 10 mass % relative to the mass of the SiO$_x$ particles 21, and is more preferably formed in a ratio of 1 to 7 mass %, and particularly preferably 2 to 5 mass %. Preferably, the first coating 23 is formed over the entire surface of the SiO$_x$ particles 21 and, from points of view such as the suppression of the increase in resistance and the reduction of reactivity with the electrolytic solution, is preferably formed in a ratio of 1 to 3 mass % relative to the mass of the SiO$_x$ particles 21. The second coating 24 does not need to cover the entire surface of the SiO$_x$ particles 21, and may be formed partially to facilitate the penetration of the electrolytic solution while still ensuring that conductivity is not decreased. The second coating 24 is preferably formed in a ratio of 1 to 3 mass % relative to the mass of the SiO$_x$ particles 21 coated with the first coating 23. For example, the thicknesses of the first coating 23 and the second coating 24 are each 10 to 200 nm.

Examples of the methods for forming the carbon coating 22 include mixing of the SiO$_x$ particles 21 with coal tar or the like followed by heat treatment, and chemical vapor deposition (CVD) using a hydrocarbon gas or the like. Alternatively, the carbon coating 22 may be formed by attaching carbon such as carbon black or Ketjen black to the surface of the SiO$_x$ particles 21 using a binder.

The first coating 23 is preferably formed by mixing the SiO$_x$ particles 21 with coal tar or the like and heat treating the mixture. The carbon source for the first coating 23 is preferably one which forms amorphous carbon on the surface of the SiO$_x$ particles 21, with examples including coal tar, tar pitch, naphthalene, anthracene and phenanthrolene. Coal tar or petroleum tar is preferable. The heat treatment temperature is preferably 800° C. to 1100° C. to ensure that a quality first coating 23 will be formed while preventing deteriorations due to oxidation, nitridation or the like of the SiO$_x$ particles 21.

The second coating 24 is preferably formed by chemical vapor deposition treatment. The carbon source for the second coating 24 is preferably one which forms, on the surface of the SiO$_x$ particles 21, carbon having high conductive properties and higher crystallinity than the carbon forming the first coating 23. Examples of such carbon sources include hydrocarbon gases such as methane, ethane, ethylene and acetylene. Chemical vapor deposition allows highly crystalline carbon to be formed at a relatively low temperature of about 1000° C.

The second coating 24 may be formed by attaching a carbon material such as carbon black, graphite or acetylene black onto the surface of the SiO$_x$ particles 21 coated with the first coating 23 while using a binder such as cellulose, polyimide, polyvinylidene fluoride, styrene-butadiene rubber or polyacrylic acid.

The negative electrode mixture layers 12 include, as a binder, a compound having at least one of a carboxyl group and a hydroxyl group and having an average number of etherifying agent moieties present per unit molecule of not more than 0.8 (hereinafter, the compound will be written as the "compound C"). The etherifying agent is a compound having a substituent capable of forming an ether bond with a carboxyl group or a hydroxyl group, with examples including carboxylic acids such as ethanoic acid and propanoic acid, alcohols such as methanol and ethanol, alkylene oxides such as ethylene oxide and propylene oxide, and salts of these compounds. The first negative electrode active material 20 has a large number of hydroxyl groups in the low crystalline first coating 23 and therefore tends to allow a compound, such as CMC, having an average number of etherifying agent moieties present per unit molecule of not more than 0.8 to adsorb thereto. The use of the compound C having an average number of etherifying agent moieties of not more than 0.8 results in an increase in the dispersibility of the materials constituting the negative electrode mixture layers 12, and enhances the adhesion among the materials constituting the mixture layers and also the adhesion of the mixture layers with respect to the current collector, facilitating the prevention of the breakage of the electrode plate structure due to charging and discharging.

For example, the compound C is at least one which is selected from carboxyalkylcelluloses such as CMC, hydroxyalkylcelluloses such as hydroxyethylcellulose (HEC), alkoxycelluloses such as methylcellulose, polyacrylic acid (PAA), salts of these compounds, and modified products of these compounds, and which has an average number of etherifying agent moieties present per unit molecule of not more than 0.8. Of these, celluloses and salts thereof are preferable, carboxyalkylcelluloses and salts thereof are more preferable, and CMC and salts thereof (in particular, Na salt) are particularly preferable.

The average number of etherifying agent moieties present per unit molecule, in the case of cellulose, may be represented as the etherification degree. The etherification degree is an average number which indicates how many of the three hydroxyl groups present in the glucose unit of the cellulose are substituted with an etherifying agent. For example, the etherification degree is 1 when one of the three hydroxyl groups present in the glucose unit of the cellulose is substituted with a carboxyl group or the like. That is, the cellulose added to the negative electrode mixture layers 12 is such that not more than 0.8 hydroxyl groups on average are substituted with a carboxyl group or the like per glucose unit.

In addition to the compound C, an additional binder may be used, with examples including fluororesins, PAN, polyimide resins, acrylic resins and polyolefin resins similarly to those in the positive electrodes, and styrene-butadiene rubber (SBR) and polyvinyl alcohol (PVA). From points of view such as the enhancement in cycle characteristics, the content of the compound C in the negative electrode mixture layers 12 is preferably higher than the content of the additional binder. The mass ratio of the compound C to the additional binder is preferably 98:2 to 50:50, and more preferably 80:20 to 60:40.

[Nonaqueous Electrolytes]

The nonaqueous electrolyte includes a nonaqueous solvent and an electrolyte salt dissolved in the nonaqueous solvent. The nonaqueous electrolytes are not limited to liquid electrolytes (nonaqueous electrolytic solutions), and may be solid electrolytes such as gelled polymer electrolytes. Examples of the nonaqueous solvents include esters, ethers, nitriles such as acetonitrile, amides such as dimethylformamide, and mixed solvents including two or more of these solvents. The nonaqueous solvent may include a halogenated compound resulting from the substitution of any of the above solvents with halogen atoms such as fluorine in place of at least part of the hydrogen atoms.

Examples of the esters include cyclic carbonate esters such as ethylene carbonate (EC), propylene carbonate (PC) and butylene carbonate, chain carbonate esters such as dimethyl carbonate (DMC), methyl ethyl carbonate (EMC), diethyl carbonate (DEC), methyl propyl carbonate, ethyl propyl carbonate and methyl isopropyl carbonate, cyclic carboxylate esters such as γ-butyrolactone (GBL) and γ-valerolactone (GVL), and chain carboxylate esters such as methyl acetate, ethyl acetate, propyl acetate, methyl propionate (MP), ethyl propionate and γ-butyrolactone.

Examples of the ethers include cyclic ethers such as 1,3-dioxolane, 4-methyl-1,3-dioxolane, tetrahydrofuran, 2-methyltetrahydrofuran, propylene oxide, 1,2-butylene oxide, 1,3-dioxane, 1,4-dioxane, 1,3,5-trioxane, furan, 2-methylfuran, 1,8-cineole and crown ethers, and chain ethers such as 1,2-dimethoxyethane, diethyl ether, dipropyl ether, diisopropyl ether, dibutyl ether, dihexyl ether, ethyl vinyl ether, butyl vinyl ether, methyl phenyl ether, ethyl phenyl ether, butyl phenyl ether, pentyl phenyl ether, methoxytoluene, benzyl ethyl ether, diphenyl ether, dibenzyl ether, o-dimethoxybenzene, 1,2-diethoxyethane, 1,2-dibutoxyethane, diethylene glycol dimethyl ether, diethylene glycol diethyl ether, diethylene glycol dibutyl ether, 1,1-dimethoxymethane, 1,1-diethoxyethane, triethylene glycol dimethyl ether and tetraethylene glycol dimethyl.

Some preferred halogenated compounds are fluorinated cyclic carbonate esters such as fluoroethylene carbonate (FEC), fluorinated chain carbonate esters, and fluorinated chain carboxylate esters such as fluoro methyl propionate (FMP).

The electrolyte salt is preferably a lithium salt. Examples of the lithium salts include $LiBF_4$, $LiClO_4$, $LiPF_6$, $LiAsF_6$, $LiSbF_6$, $LiAlCl_4$, $LiSCN$, $LiCF_3SO_3$, $LiCF_3CO_2$, $Li(P(C_2O_4)F_4)$, $LiPF_{6-x}(C_nF_{2n+1})_x$ ($1<x<6$, n is 1 or 2), $LiB_{10}Cl_{10}$, LiCl, LiBr, LiI, chloroborane lithium, lithium lower aliphatic carboxylates, borate salts such as $Li_2B_4O_7$ and $Li(B(C_2O_4)F_2)$, and imide salts such as $LiN(SO_2CF_3)_2$ and $LiN(C_1F_{2l+1}SO_2)(C_mF_{2m+1}SO_2)$ {1 and m are integers of 1 or greater}. The lithium salt may be a single salt or a mixture of a plurality of salts. Of these, from points of view such as ion conductivity and electrochemical stability, $LiPF_6$ is preferably used. The concentration of the lithium salt is preferably 0.8 to 1.8 mol per 1 L of the nonaqueous solvent.

[Separators]

As the separator, a porous sheet having ion permeability and insulating properties is used. Specific examples of the porous sheets include microporous thin films, woven fabrics and nonwoven fabrics. Some preferred materials of the separators are olefin resins such as polyethylene and polypropylene, and celluloses. The separator may be a stack having a cellulose fiber layer and a thermoplastic resin fiber layer such as of an olefin resin.

EXAMPLES

Hereinbelow, the present disclosure will be described in greater detail based on EXAMPLES. The scope of the present disclosure is not limited to such EXAMPLES.

Example 1

[Fabrication of Positive Electrode]

Lithium cobaltate, acetylene black (HS100 manufactured by Denka Company Limited) and polyvinylidene fluoride (PVdF) were mixed in a mass ratio of 95:2.5:2.5. As a dispersion medium, N-methyl-2-pyrrolidone (NMP) was added. After the addition of NMP, the mixture was stirred with use of a mixer (T. K. HIVIS MIX manufactured by PRIMIX Corporation) to give a positive electrode mixture slurry. Next, the slurry was applied to both sides of a positive electrode current collector composed of an aluminum foil, and the wet films were dried and rolled with a roller. A positive electrode was thus fabricated which had the positive electrode mixture layers on both sides of the positive electrode current collector. The density of the positive electrode mixture layers was 3.60 g/ml.

[Fabrication of Negative Electrode]

(Preparation of First Negative Electrode Active Material)

Si and $SiO_2$ were mixed in a molar ratio of 1:1, and the mixture was heated to 800° C. under reduced pressure. The $SiO_x$ gas resulting from the heating was cooled to precipitate polycrystalline $SiO_x$ mass. The polycrystalline $SiO_x$ mass was crushed and classified into $SiO_x$ particles having a BET specific surface area of 4.9 m²/g. The specific surface area was measured with HM-1201 manufactured by Mountech Co., Ltd.

With use of coking coal tar as a carbon source, 2 mass % of a first carbon coating relative to the mass of the $SiO_x$ particles was formed on the surface of the $SiO_x$ particles. The coking coal tar was supplied as a solution in tetrahydrofuran (mass ratio 25:75), and the coking coal tar solution and the $SiO_x$ particles were mixed in a mass ratio of 4:25. The mixture was dried at 50° C. and was heat treated at 900° C. in an inert atmosphere. The $SiO_x$ particles having the first carbon coating were analyzed on microscopic laser Raman spectrometer Lab RAM ARAMIS manufactured by HORIBA, Ltd. to measure a Raman spectrum. From the Raman spectrum, the peak intensity ratio $I_D/I_G$ was calculated to be 1.5.

The $SiO_x$ particles having the first carbon coating were subjected to chemical vapor deposition to form, on their surface, 2 mass % of a second carbon coating relative to the mass of the particles. A 1:1 by volume mixture gas of ethylene and argon was used as a carbon source, and the heat treatment was performed in vacuum at 900° C. In the manner described above, a first negative electrode active material A1 was prepared in which the low crystalline first carbon coating and the highly crystalline second carbon coating defined a two-layer carbon coating on the surface of the particles. Separately, $SiO_x$ particles having the second carbon coating alone on the surface were prepared and were analyzed on microscopic laser Raman spectrometer Lab RAM ARAMIS manufactured by HORIBA, Ltd. to measure a Raman spectrum. From the Raman spectrum, the peak intensity ratio $I_D/I_G$ was calculated to be 1.2.

(Fabrication of Negative Electrode)

A 95:5 by mass mixture of a graphite powder (volume average particle size 20 μm) and the first negative electrode active material A1 was used as a negative electrode active material. The negative electrode active material, carboxymethylcellulose sodium (CMC-Na, etherification degree 0.8) and styrene-butadiene rubber (SBR) were mixed in a mass ratio of 98:1.5:0.5 together with an appropriate amount of water using a mixer to give a negative electrode mixture slurry. Next, the slurry was applied to both sides of a negative electrode current collector composed of a copper foil, and the wet films were dried and rolled with a roller. A negative electrode was thus fabricated which had the negative electrode mixture layers on both sides of the negative electrode current collector. The density of the negative electrode mixture layers was 1.60 g/ml.

[Preparation of Nonaqueous Electrolytic Solution]

Ethylene carbonate (EC) and ethyl methyl carbonate (EMC) were mixed in a volume ratio of 3:7. Lithium hexafluorophosphate ($LiPF_6$) was added to the mixed solvent so that its concentration would be 1.0 mol/L. A nonaqueous electrolytic solution was thus prepared.

[Fabrication of Triode Test Cell]

Tabs were attached to the negative electrode that had been vacuum dried at 105° C. for 2 hours, and to a lithium metal plate. These plates were stacked one on top of the other via a separator, and the stack was sandwiched between two glass plates and was then clipped to form an electrode assembly. The electrode assembly and a reference electrode were placed into a glass cell, and the above electrolytic solution was poured. Thereafter, the glass cell was tightly closed. A triode test cell was thus fabricated. The reference electrode was a lithium metal plate.

[Measurement of Discharge Capacity]

The triode test cell was subjected to a charge discharge test under the following conditions to determine the initial cycle capacity as the discharge capacity.

Charge discharge conditions: The cell was charged at a constant current of 0.1 It (1.5 mA) to 0.0 V, rested for 10 minutes, and discharged at a constant current of 0.1 It (1.5 mA) to 1.0 V.

[Fabrication of Battery]

Tabs were attached to the positive electrode and the negative electrode. The electrodes were wound via a separator into a coil so that the tabs would come on the outermost peripheral side, thus giving a wound electrode assembly. The electrode assembly was inserted into a housing composed of an aluminum laminate sheet, and was vacuum dried at 105° C. for 2 hours. Thereafter, the nonaqueous electrolytic solution was poured and the open end of the housing was sealed. A battery was thus fabricated. The design capacity of the battery was 800 mAh.

[Evaluation of Cycle Characteristics (Capacity Retention after 500 Cycles)]

The battery was subjected to a charge discharge test under the following conditions. The capacity retention in the 500th cycle was calculated using the equation below.

Capacity retention=(Discharge capacity in 500th cycle/Discharge capacity in 1st cycle)×100

Charge discharge conditions: The battery was charged at a constant current of 1.0 It (800 mA) until the battery voltage reached 4.2 V, and was thereafter charged at a constant voltage of 4.2 V until the current value reached 0.05 It (40 mA). After a rest of 10 minutes, the battery was discharged at a constant current of 1.0 It (800 mA) until the battery voltage reached 2.75 V.

Example 2

A negative electrode, a triode test cell and a battery were fabricated in the same manner as in EXAMPLE 1, except that CMC-Na having an etherification degree of 0.7 was used.

Example 3

A negative electrode, a triode test cell and a battery were fabricated in the same manner as in EXAMPLE 1, except that the conditions for the crushing and classification of the $SiO_x$ mass were changed to control the BET specific surface area of the $SiO_x$ particles to 2.3 m²/g.

Example 4

A negative electrode, a triode test cell and a battery were fabricated in the same manner as in EXAMPLE 1, except that the conditions for the crushing and classification of the $SiO_x$ mass were changed to control the BET specific surface area of the $SiO_x$ particles to 5.9 m=/g.

Comparative Example 1

A negative electrode, a triode test cell and a battery were fabricated in the same manner as in EXAMPLE 1, except that the carbon coatings were formed in the reversed order on the surface of the $SiO_x$ particles.

Comparative Example 2

A negative electrode, a triode test cell and a battery were fabricated in the same manner as in EXAMPLE 1, except that instead of the second carbon coating, a coating that was the same as the first carbon coating was formed again using coking coal tar.

Comparative Example 3

A negative electrode, a triode test cell and a battery were fabricated in the same manner as in EXAMPLE 1, except that CMC-Na having an etherification degree of 1.2 was used.

TABLE 1

| | Crystallinity of carbon coatings (inside/outside) | Etherification degree of binder | Discharge capacity | Capacity retention (%) |
|---|---|---|---|---|
| EX. 1 | Low/High | 0.8 | 100 | 100 |
| EX. 2 | Low/High | 0.7 | 100 | 100 |
| COMP. EX. 1 | High/Low | 0.8 | 100 | 87 |
| COMP. EX. 2 | Low/Low | 0.8 | 95 | 94 |
| COMP. EX. 3 | Low/High | 1.2 | 100 | 94 |

TABLE 2

| | Crystallinity of carbon coatings (inside/outside) | $SiO_x$ specific surface area ($m^2$/g) | Discharge capacity | Capacity retention (%) |
|---|---|---|---|---|
| EX. 1 | Low/High | 4.9 | 100 | 100 |
| EX. 3 | Low/High | 2.3 | 100 | 103 |
| EX. 4 | Low/High | 5.9 | 99 | 95 |

Table 1 shows that the batteries of EXAMPLES have excellent cycle characteristics as compared to the batteries of COMPARATIVE EXAMPLES. That is, cycle characteristics are improved specifically by forming, on the surface of $SiO_x$ particles, a two-layered carbon coating having a low crystalline carbon coating on the inner side and a highly crystalline carbon coating on the outer side, and also by using CMC-Na having an etherification degree of not more than 0.8 as a binder. Further, from Table 2, the cycle characteristics are improved to a greater extent by using $SiO_x$ particles having a BET specific surface area of not more than 5 $m^2$/g.

REFERENCE SIGNS LIST

10 NEGATIVE ELECTRODE, 11 NEGATIVE ELECTRODE CURRENT COLLECTOR, 12 NEGATIVE ELECTRODE MIXTURE LAYER, 20 FIRST NEGATIVE ELECTRODE ACTIVE MATERIAL, 21 $SiO_x$ PARTICLE, 22 CARBON COATING, 23 FIRST COATING, 24 SECOND COATING

The invention claimed is:

1. A negative electrode for nonaqueous electrolyte secondary batteries comprising a negative electrode current collector and a negative electrode mixture layer disposed on the current collector, wherein
the negative electrode mixture layer includes $SiO_x$ 0.5≤x≤1.5 particles having a carbon coating on a particle surface, carbonaceous active material particles, and a compound having at least one of a carboxyl group and a hydroxyl group and having an average number of etherifying agent moieties present per unit molecule of not more than 0.8, and
the carbon coating includes a first coating disposed on the surface of the $SiO_x$ particles and a second coating disposed on the first coating and including carbon having higher crystallinity than the carbon forming the first coating, wherein a thickness of the second coating is 10 to 200 nm.

2. The negative electrode for nonaqueous electrolyte secondary batteries according to claim 1, wherein the $SiO_x$ particles have a BET specific surface area of not more than 5 $m^2$/g.

3. The negative electrode for nonaqueous electrolyte secondary batteries according to claim 1, wherein the compound is at least one selected from carboxyalkylcelluloses, hydroxyalkylcelluloses, alkoxycelluloses, salts of these compounds, and modified products of these compounds, and has an etherification degree of not more than 0.8.

4. A nonaqueous electrolyte secondary battery comprising:
the negative electrode for nonaqueous electrolyte secondary batteries described in claim 1,
a positive electrode, and
a nonaqueous electrolyte.

* * * * *